(12) United States Patent
Berg

(10) Patent No.: US 6,489,894 B2
(45) Date of Patent: Dec. 3, 2002

(54) LEAK DETECTION DEVICE FOR DOUBLE-WALL PIPELINE SYSTEMS AND CONTAINER SYSTEMS

(75) Inventor: Jost Berg, Wilnsdorf (DE)

(73) Assignee: Sicherungsgerätebau GmbH, Siegen (DE)

(*) Notice: Subject to any disclaimer, the term of this patent is extended or adjusted under 35 U.S.C. 154(b) by 0 days.

(21) Appl. No.: 09/967,471

(22) Filed: Sep. 27, 2001

(65) Prior Publication Data

US 2002/0044060 A1 Apr. 18, 2002

(30) Foreign Application Priority Data

Sep. 30, 2000 (DE) .......................................... 100 48 562

(51) Int. Cl.[7] .............................................. G08B 21/00
(52) U.S. Cl. .......................... 340/605; 340/626; 73/40; 73/40.5 R; 73/49.5
(58) Field of Search ................................ 340/604, 605, 340/626; 73/40.5 R, 49.5, 40

(56) References Cited

U.S. PATENT DOCUMENTS 4,088,987 A * 5/1978 Resler et al. ................ 340/626
4,161,957 A * 7/1979 Schoellkopf ............. 73/40.5 R
5,727,589 A * 3/1998 Yokogi ........................ 137/240
6,305,215 B2 * 10/2001 Lehmann ..................... 73/49.3

* cited by examiner

Primary Examiner—Daniel J. Wu
(74) Attorney, Agent, or Firm—Friedrich Kueffner

(57) ABSTRACT

A leak detection device for double-wall pipeline or container systems has a leak detector with a vacuum pump, a pressure-dependent switch for the vacuum pump, and an alarm device. The leak detector monitors simultaneously several containers. A collecting main is connected to the vacuum pump and by vacuum lines to the containers. Each container has a vacuum connector connected to a control space of the container. The control spaces are parallel connected to the leak detector. Each vacuum line has a first liquid lock arranged at the vacuum connector so as to block liquid that has leaked into the vacuum lines from a leaky container from penetrating into the control spaces of the leak-free containers. A second liquid lock is arranged in the collecting main to prevent liquid from entering the vacuum pump. A measuring line taps the collecting main and is connected to the leak detector.

6 Claims, 1 Drawing Sheet

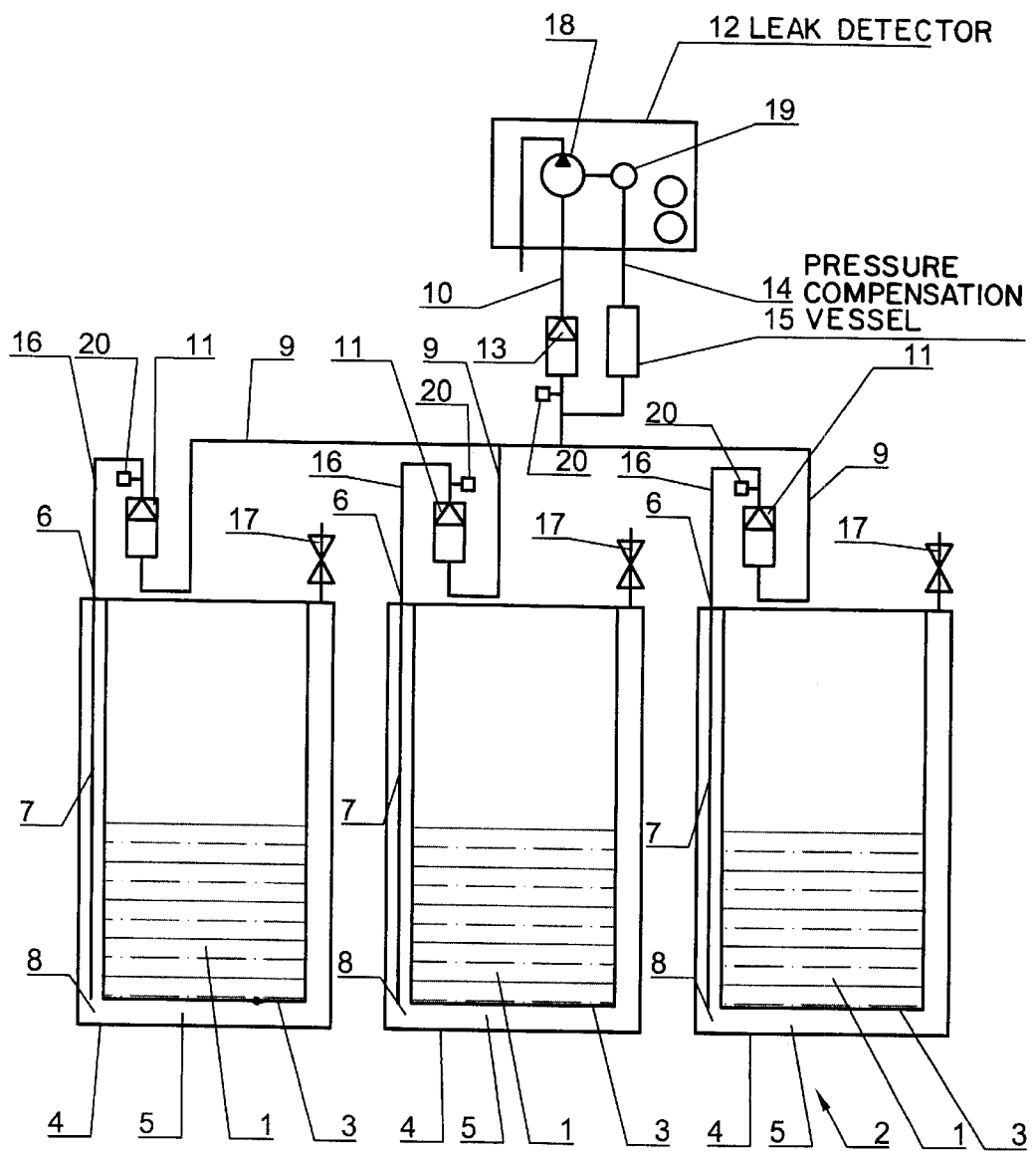

LEAK DETECTION DEVICE FOR DOUBLE-WALL PIPELINE SYSTEMS AND CONTAINER SYSTEMS

BACKGROUND OF THE INVENTION

1. Field of the Invention

The invention relates to a leak detection device for double-wall pipeline systems and container systems, in particular, multi-tank systems for heating oil, comprised of several individual double-wall containers or pipeline segments each provided with a control space; a leak detector which is comprised of a vacuum pump and a pressure-dependent switching device for controlling the vacuum pump; as well as an alarm device comprised of an optical and/or acoustic alarm indicator. The leak detection device is used for simultaneous and continuous monitoring of several containers or pipeline segments wherein each container or each pipeline segment has a vacuum connector for the control space and wherein in front of the vacuum connector a liquid lock is arranged.

2. Description of the Related Art

Devices of the aforementioned kind are known, for example, from German patent 21 61 564. This leak detection device has a single leak detector, known in the art, comprised of a vacuum pump and a pressure-dependent switching device for controlling the vacuum pump as well as an alarm device comprised of an optical and/or acoustic alarm indicator for simultaneously and continuously monitoring several containers. The control spaces of the container are connected by at least one vacuum and measuring line and optionally a collecting main with the common control container which is connected by a vacuum line to the vacuum pump of the leak detector and by a measuring line to the pressure-dependent switching device of the leak detector. The vacuum and measuring lines have, as is known in the art, a liquid lock.

A further leak detection device is known from German patent 196 37 868 C1. This leak detection device is provided with a serial connection of the control spaces of the individual containers of the container system by: a connection of the measuring line connector and of the vacuum connector of the control spaces of two successively arranged containers by means of a connecting line; two liquid locks each mounted in the connecting lines between the control spaces of two successively arranged containers in front of the measuring connector and the vacuum connector; a connection of the vacuum connector of the control space of the first container of the container system, viewed in the vacuum flow direction of the vacuum pump of the leak detector, by means of a vacuum line with the vacuum pump of the leak detector; and a connection of the measuring line connector of the control space of the last container of the container system, viewed in the vacuum flow direction of the vacuum pump, by means of a measuring line with the pressure-dependent switching device of the leak detector; as well as a liquid lock provided in the vacuum line of the vacuum pump of the leak detector in front of the vacuum connector of the first container of the container system.

Both known leak detection devices require a relatively large number of connecting lines so that the assembly expenditure is very high. Moreover, in these leak detection devices many connectors are provided which must all be sealed; however, there is still always the risk that leaks will occur. The leak detection device according to German patent 296 37 868 C1 has moreover the disadvantage that many liquid locks are required.

SUMMARY OF THE INVENTION

It is an object of the present invention to provide a leak detection device of the aforementioned kind having, on the one hand, only a relatively small number of connecting lines and liquid locks and, on the other hand, being characterized by a significantly reduced assembly expenditure, wherein both measures contribute to a cost reduction.

In accordance with the present invention, this is achieved by providing: a parallel connection of the control spaces of all individual containers of the container system or the pipeline segments of the pipeline system by combining the individual vacuum lines of all individual containers or pipeline segments to a collecting main; a liquid lock arranged in the collecting main to the vacuum pump of the leak detector; a measuring line tapping the collecting main; and an arrangement of the liquid locks in front of the vacuum connector, which, in an alarm situation, prevent the penetration of heating oil from a leaking individual container or pipeline segment into the control spaces of one or several individual containers or pipeline segments that are not defective.

The leak detection device according to the invention for double-wall pipeline systems and container systems, which is characterized essentially by a parallel connection of the control spaces of all individual containers of the container system or the pipeline segments of the pipeline system by means of combining the individual vacuum lines of all individual containers or pipeline segments to a collecting main, is distinguished, in comparison to the known leak detection devices, by being able to simultaneously monitor several containers or pipeline segments with a relatively simple constructive configuration and by providing a simplified and faster assembly as well as favorable manufacturing costs.

BRIEF DESCRIPTION OF THE DRAWING

In the only drawing one embodiment of a leak detection device according to the present invention is illustrated which is configured for monitoring several individual double-wall containers.

DESCRIPTION OF THE PREFERRED EMBODIMENTS

The only FIGURE illustrates a leak detection device, which is described in the following only as an example of the present invention, useful for monitoring several individual double-wall containers of a container system 2 (illustrated in the drawing in the form of three containers 1; this is to be viewed only as an example). The containers 1 have an inner wall 3 and a control space 5 provided between the inner wall 3 and the outer wall 4. The leak detection device, of course, can also serve for monitoring double-wall pipeline systems (not illustrated). In the following description, the term "container" is meant to include pipeline segments.

A vacuum connector 6 is connected to each one of the containers 1 and provides a connection to the control space 5. A vacuum conduit 7 extends from the vacuum connector 6 through the control space 5 to the bottom 8 of the container 1. The control spaces 5 of the individual containers 1 of the container system 2 are connected in parallel by individual vacuum lines 9 wherein all vacuum lines 9 are connected (combined) to a common collecting main 10. Liquid locks 11 are mounted in the vacuum lines 9 extending to the control spaces 5 downstream of the vacuum connectors 6 when viewed in the direction of vacuum flow from the control space 5 to a vacuum 18 pump of the leak detector 12.

The collecting main 10 is connected to the vacuum pump 18 of the leak detector 12. An additional liquid lock 13 is mounted in the collecting main 10 upstream of the vacuum pump.

A measuring line 14 is connected to the collecting main 10 which is connected with the pressure-dependent switching device 19 of the leak detector 12. In the measuring line 14 a pressure compensation vessel 15 is provided upstream of the switching device 19 of the leak detector 12.

The liquid locks 11 at the vacuum connectors 6 are provided only for an alarm situation, i.e., when liquid leaks from a container, and thus arranged such that the penetration of heating oil, having leaked from a leaking container 1 into the vacuum lines 9, into the control spaces 5 of one or more containers 1 that are not defective is prevented.

Between the vacuum connector 6 and the liquid lock 11 of the individual containers 1 a transparent line section 16 is provided for a visual control in the case of a leak of liquid from the containers.

A testing connector 17 is provided on each container 1. This connector 17 is used for triggering an alarm for testing purposes.

In front of the liquid locks 11 a sensor 20 for detecting the presence of liquid can be provided in the vacuum lines 9 or the collecting main 10.

The operation of the leak detection device for monitoring the individual containers 1 of the container system 2 is described in the following.

By means of the vacuum pump 18 of the leak detector 12 a vacuum is generated in the control spaces 5 of the containers 1 via the main vacuum line 10, the vacuum lines 9 connected between the control spaces 5 of the individual containers 1 of the container system 2, and the vacuum conduits 7 extending into the control spaces 5. The vacuum in the control spaces 5 of the containers 1 is monitored continuously by a pressure transponder or sensing device for the purpose of controlling the vacuum pump as well as the optical and/or acoustic alarm indicator of the alarm device, wherein the pressure transponder of the leak detector 12 is connected to the control spaces 5 via the measuring line 14, the vacuum conduits 7 serving as measuring lines and extending into the control spaces 5 of the containers 1, and the vacuum lines 9 connected between the control spaces 5 of the containers 1. For minimal leaks in the container system 2 and in the entire line system of the leak detection device, the testing vacuum drops and is regenerated again and again by the vacuum pump 18 within the preset control range. When the vacuum drops more severely, an alarm is triggered by means of the pressure switch of the leak detector 12. This type of alarm trigger action is realized for air leaks, wherein it is inconsequential whether the outer wall 4 or the inner wall 3 of the container 1 above the liquid level does have a leak.

When a leak occurs below the liquid level, for example, in the inner wall 3 of one of the containers 1, liquid will enter the control space 5 as a result of the vacuum. This liquid is then sucked by the vacuum pump of the leak detector 12 through the vacuum conduit 7 and the transparent line section 16 via the correlated liquid lock 11 and the vacuum line 9 into the collecting main 10 to the liquid lock 13 which is closed off by the leaking liquid. In order for the liquid from the leaking container 1 to be prevented from entering the non-defective containers 1, the liquid locks 11 will close. The still present vacuum in the control space 5 of the leak container 1 will draw in even more liquid so that the vacuum in the control space 5 of the container 1 will continuously decrease. The vacuum pump 18 of the leak detector 12 remains switched on but can no longer evacuate. After a short period of time, the vacuum in the measuring line 14 has dropped to such an extent that the pressure switch of the leak detector 12 will trigger an alarm. Because of the leaking liquid that has reached the transparent line segment 16 it can then be determined which container 1 of the container system 2 has leaked.

While specific embodiments of the invention have been shown and described in detail to illustrate the inventive principles, it will be understood that the invention may be embodied otherwise without departing from such principles.

What is claimed is:

1. A leak detection device for double-wall pipeline systems and container systems comprised of several individual double-wall containers or pipeline segments containing liquid, the leak detecting device comprising:
   a leak detector comprising a vacuum pump, a pressure-dependent switching device configured to control the vacuum pump, and an alarm device having a visual alarm indicator, an acoustic alarm signal or a visual and acoustic alarm indicator, wherein the leak detector is configured to simultaneously and continuously monitor several containers or pipeline segments;
   a collecting main connected to the vacuum pump of the leak detector;
   vacuum lines connected to the collecting main, wherein each one of the vacuum lines is connected to one of the containers or the pipeline segments, respectively;
   a vacuum connector provided on each one of the containers or pipeline segments, respectively, and configured to connect a control space of the container or the pipeline segment, respectively, to the vacuum line connected to the container or the pipeline segment, so that the control spaces of the containers or pipeline segments are parallel connected to the leak detector;
   each one of the vacuum lines having a first liquid lock arranged in front of the vacuum connectors, respectively, so as to block liquid present in the vacuum lines as a result of a leak in one of the containers or pipeline segments from penetrating into the control spaces of one or more of the containers or pipeline segments not suffering a leak;
   a second liquid lock arranged in the collecting main configured to prevent liquid from entering the vacuum pump;
   a measuring line tapping the collecting main and connected to the leak detector.

2. The leak detection device according to claim 1, further comprising a testing connector provided for each of the containers or pipeline segments and configured to perform a test alarm.

3. The leak detection device according to claim 1, wherein the vacuum lines between the vacuum connector and the first liquid locks are comprised of a transparent line segment in order to allow a visual inspection for leaking liquid.

4. The leak detection device according to claim 1, further comprising a sensor configured to detect the presence of liquid and arranged in front of the first liquid locks in the vacuum lines or the collecting main.

5. The leak detection device according to claim 1, further comprising vacuum conduits connected to the vacuum connectors and extending to a bottom of the container or the pipeline segments, respectively.

6. The leak detection device according to claim 1, further comprising a pressure compensating vessel arranged in the measuring line.

* * * * *